Feb. 28, 1956 L. SCHMID 2,736,411
SYNCHRONIZING MECHANISMS FOR CHANGE SPEED GEARS
Filed Dec. 5, 1951 2 Sheets-Sheet 1

INVENTOR
Leopold Schmid
ATTORNEYS

Feb. 28, 1956 L. SCHMID 2,736,411
SYNCHRONIZING MECHANISMS FOR CHANGE SPEED GEARS
Filed Dec. 5, 1951 2 Sheets-Sheet 2
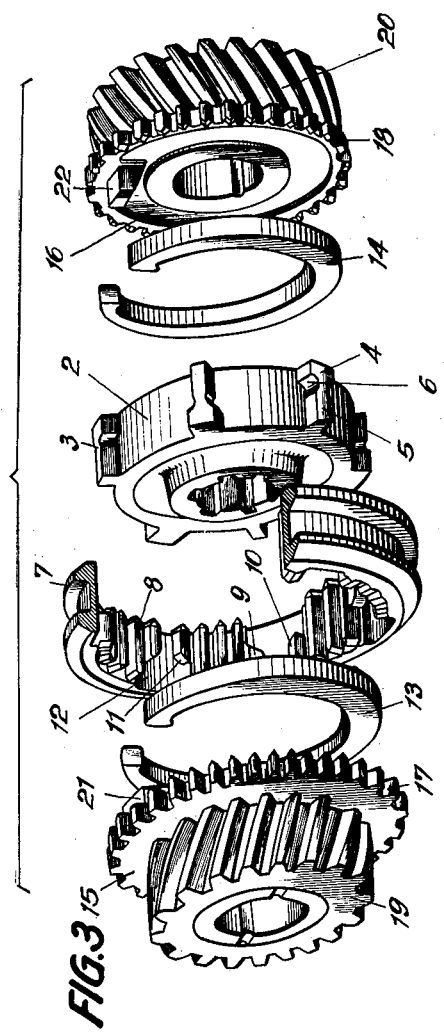
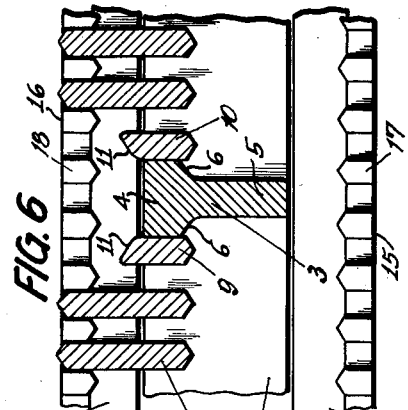
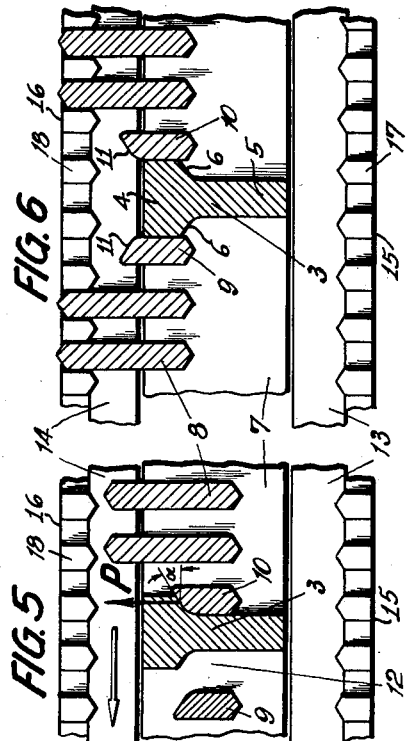
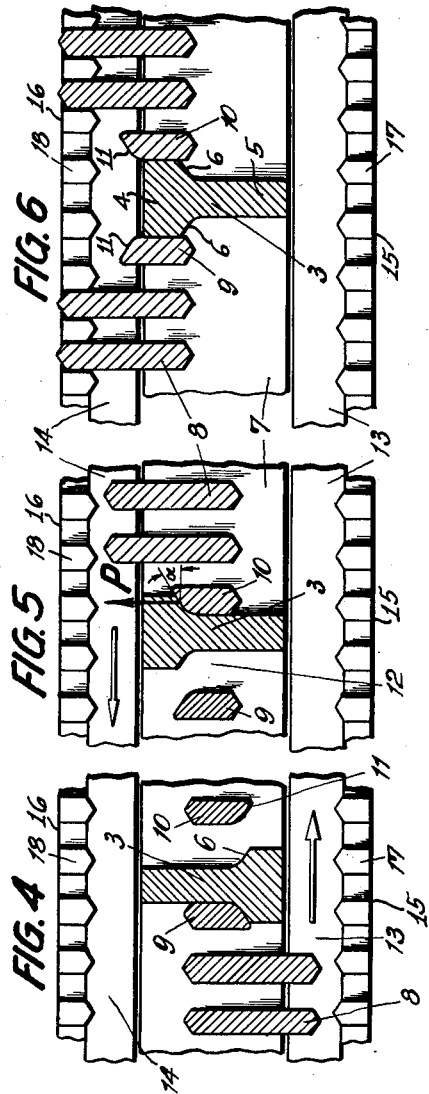
INVENTOR
Leopold Schmid
ATTORNEYS

United States Patent Office 2,736,411
Patented Feb. 28, 1956

2,736,411

SYNCHRONIZING MECHANISMS FOR CHANGE SPEED GEARS

Leopold Schmid, Stuttgart-Sillenbuch, Germany, assignor, by mesne assignments, to Dr. Ing. h. c. F. Porsche K. G., Stuttgart-Zuffenhausen, Germany, a corporation of Germany Application December 5, 1951, Serial No. 260,059

Claims priority, application Austria January 11, 1951

7 Claims. (Cl. 192—53)

The invention relates to improvements in synchronizing mechanisms for synchronizing the gears of a speed-change gear system when the gears are shifted from one speed to another. More particularly the invention relates to improvements in speed-change gears for power-driven vehicles which include a slidable or shiftable sleeve having a friction body which is brought into frictional engagement with a second frictional body connected with the gear part to be coupled, prior to the meshing of the gear teeth in the coupling operation, and to means for preventing the gear teeth from being brought into mesh until synchronism is established.

In known arrangements for synchronizing gears, where such gears are provided with a locking device, the person operating the shifting means can exert a practically unlimited force on the two friction bodies of the synchronizing mechanism, for making a preliminary coupling, which has the effect of increasing the friction. Although the application of such force accelerates synchronization in such devices, there will be rapid wear and the ability to make preliminary coupling will soon be destroyed. Moreover, the devices of the type referred to are unduly complicated and consist of many parts which require tooling, so that they not only require frequent repair but their initial cost is high. A serious disadvantage in the use of such synchronizing means and in the effecting of coupling with unlimited application of pressure is that, when the main coupling between the engine is not entirely free, it is impossible to effect a gear change.

The primary object of the present invention is to overcome the difficulties and obstacles referred to above and to provide an arrangement for synchronizing gears in a gear shifting operation which occupies a relatively small space, which is simple to construct and which does not require expensive parts and tooling.

According to one feature of the present invention, an important object is achieved and many of the difficulties referred to above are overcome by providing a sliding or shiftable sleeve having gear teeth which function as one of the frictional bodies and gear teeth which are formed in such a manner as to act as stops for preventing non-synchronized engagement of the gears to be shifted. In this construction of the sleeve, the set of gear teeth of the sleeve thus fulfill three important purposes, they act as engaging or meshing teeth, as friction bodies, and as stop surfaces for a locking arrangement provided in the system, whereby the structural parts used in the system are reduced to a minimum.

Another important feature of the invention comprises the use of a split spring ring as the second frictional body, it being engaged by gear teeth of the shiftable sleeve, this ring being operatively associated with the gear to be brought in mesh with the shiftable sleeve and secured against relative turning or rotation with respect thereto. In this construction, the arrangement for synchronizing the gears is so contrived that, when frictional engagement is obtained between gear teeth of the sleeve and the spring ring, no additional force can be exerted which would in any way increase the friction between the sleeve and the ring. Furthermore, the operation of the mechanism is such that it is impossible for the operator to change or shift the gears into mesh as long as the ring has not completed its synchronizing operation.

In an advantageous construction according to the invention, in which the synchronizing and gear shifting arrangement takes up a particularly small space, the mechanism comprises a shaft having thereon a sleeve carrier rotatable with the shaft and provided at its periphery with laterally-extending stop members or dogs distributed at regularly spaced intervals around the periphery of the carrier by which the sleeve is keyed thereto. The slidable or shiftable sleeve referred to above extends around the sleeve carrier and is provided with an internal set of gear teeth having recesses arranged therein for receiving and accommodating the stop members on the sleeve carrier. The stop members or dogs are raised elements on the periphery of the carrier, each consisting of a hammer-like head connected by sloping side parts or shoulders with a narrower web. In the sleeve the recess provided for accommodating teach stop member of the carrier is formed by leaving a tooth gap and by providing short gear teeth adjacent the web, each having guiding surfaces for engaging the sloping shoulders of the stop or locking member.

Since it is advantageous in this construction to have the shifting sleeve move in both directions with respect to its normal position around the carrier, the stop members are arranged so that their heads and web portions alternately face in opposite directions, the adjacent short gear teeth of the sleeve also being correspondingly arranged alternately to one side and the other so that the locking effect is the same for both operative positions of the shifting sleeve. In a preferred construction, the sloping surfaces of the short teeth, which serve as guides for the stop or locking members are inclined at an angle between 10 and 45° with respect to a plane parallel to the shifting sleeve.

The improved system of the present invention includes other features, objects and advantages which are described more in detail hereinafter in connection with the accompanying drawings, which show a constructional example and which form a part of this application.

In the drawings:

Fig. 3 is a perspective exploded view to a smaller scale, of the elements of the mechanism shown in Fig. 1;

Figs. 4, 5, and 6 are enlarged detail sectional views taken through the teeth and stop members of the sleeve and sleeve carrier illustrating the functioning of the locking mechanism in a shifting operation.

Figure 1:
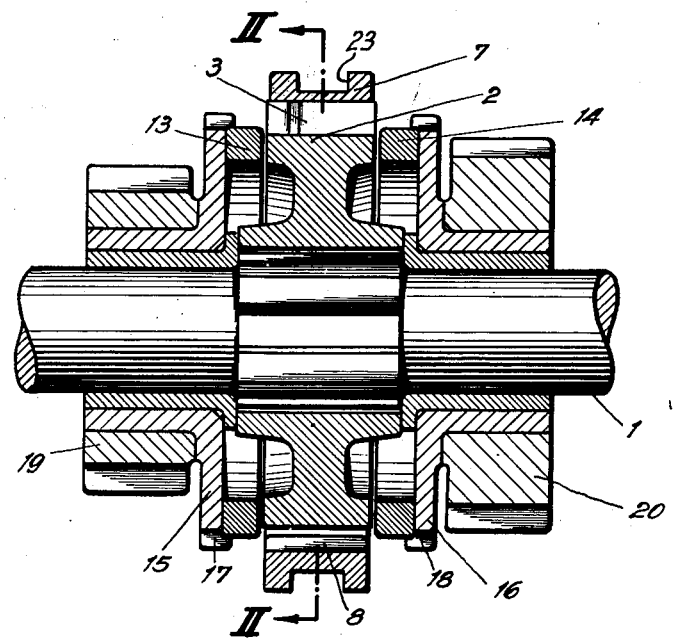
Fig. 1 is a broken vertical longitudinal sectional view taken on the line I—I of Fig. 2, through a synchronizing and gear shifting system constructed according to the present invention.
Figure 2:
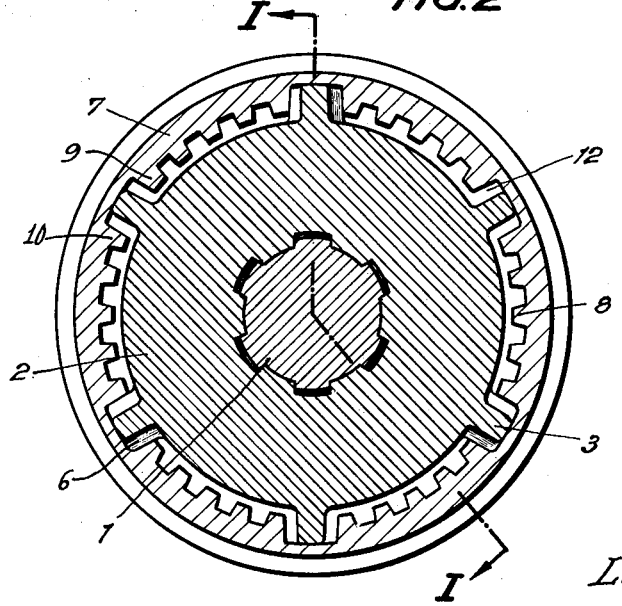
Fig. 2 is a transverse vertical sectional view taken on the plane of the line II—II of Fig. 1.

Referring to the Figs. 1, 2, and 3 of the drawings, the speed-change mechanism illustrated therein comprises a driving shaft 1, on which is mounted a sleeve carrier 2, which is secured against rotation and longitudinal displacement with respect to its position on the shaft. In the constructional example illustrated, the outer periphery of the sleeve carrier 2 is provided with six integral or attached stop members or dogs 3 spaced at equal distances apart around the periphery of the carrier and extending laterally thereacross. Each of these members 3 consists of a symmetrically shaped head 4 in the manner of a double hammer head and a narrower bar or web part 5 (Fig. 3). Inclined surfaces or shoulders 6 are provided on opposite sides of the stop member 3 between the head 4 and the web 5, as shown more clearly in Fig. 4.

A laterally displaceable shifting sleeve 7 is slidably supported on and extends around the sleeve carrier 2. This sleeve is provided with an inwardly-projecting set of gear teeth 8, the opposite ends of which are beveled to facilitate meshing. Tooth gaps are provided in the internal set of teeth 8 in the sleeve 7 for accommodating the stop members 3 of the sleeve carrier, a tooth being omitted at the position of each member 3 and shorter teeth 9 and 10 being provided adjacent to the gap where the teeth are omitted, such shorter teeth being provided with inclined abutment surfaces 11 sloping away from the member 3 therebetween. The width of the heads of the members 3 is such that the heads are adapted to fit and slide between the shorter teeth 9 and 10 in the manner shown in Fig. 6. The omission of a tooth 8 and the provision of the shorter teeth 9 and 10 at the position of each stop member 3 provides recesses 12 for the stop members 3. In the neutral position of the sleeve 7, the recesses provide some relative rotary movement or play between the sleeve and sleeve carrier.

Slit or split synchronizing spring rings 13 and 14 are respectively disposed on the opposite sides of the sleeve carrier 2 around the shaft 1 adjacent to coupling gears 15 and 16, respectively, the coupling gears 15 and 16 being on opposite sides of the sleeve carrier and provided with sets of gear teeth 17 and 18, respectively, such teeth having inwardly projecting pointed or beveled ends which extend respectively over the spring rings 13 and 14 in the manner shown in Fig. 1 of the drawings. Also as shown in Fig. 1, the rings 13 and 14 are mounted, respectively, adjacent to the sleeve carrier 2 and are uniformly spaced with respect to the axis of the shaft 1. Small and large gear wheels 19 and 20 are respectively shrunk on or otherwise connected to the coupling gears 15 and 16. These gear assemblies are adapted to rotate on the shaft 1. The coupling gear 15 is provided with a lateral projection 21 which engages in the slit of the ring 13 and the coupling gear 16 is provided with a projection 22 which engages in the slit of the ring 14.

Since the ends of the spring rings are adapted to abut against the respective projections 21 and 22, the rings are thereby secured against rotation with respect to the coupling gears 15 and 16, respectively. This manner of drive for the synchronizing mechanism causes the synchronizing rings 13 and 14 to be forced open in a synchronizing operation and consequently results in an increase of the pressure exerting force by contact pressure, before synchronization is reached.

The thickened heads 4, together with their inclined surfaces 6 of the stop members or dogs 3, extend alternately to the respective peripheral edges of the sleeve carrier. In a corresponding manner, the short teeth 9 and 10 are arranged alternately on the opposite sides of the shifting sleeve 7. The object of this arrangement is to be able to shift the sleeve to both sides of the sleeve carrier with a locking effect.

When it is desired to change gears, the slidable shifting sleeve 7 is displaced from its neutral position shown in Fig. 1, corresponding to the idle running position of the mechanism, either to the left or to the right, according to which gear change is to be made. This shift is made by any desired type of shift lever, such as the kind which would be connected to a ring (not shown) operating in a peripheral slot 23 of the shifting sleeve 7. In the shifting operation, the crowns of the teeth 8 provide an interrupted friction surface which, when the sleeve is shifted, comes into frictional contact with the slightly upwardly and outwardly sloping peripheral surface of one of the synchronizing rings 13 and 14. Since these rings are secured against rotation with respect to the coupling gears 15 and 16, the shift sleeve 7 will, when frictional contact is established, be rotated slightly with respect to the sleeve carrier 2, to the extent of the spacing of the short teeth 9 and 10. In this initial part of the synchronizing operation, the position of the stop members 3 with respect to the teeth 9 and 10 will be that shown in Fig. 4 or 5, with the coupling gears 15 and 16 and the rings 13 and 14 rotating respectively in the direction of the arrows on the rings. In Fig. 4, it will be noted that the peripheral surface of the synchronizing ring 13 has been engaged by the teeth 8 and resulted in the rotation of the sleeve 7 to the extent that the gear tooth 9 has been moved into engagement with the web 5 of the stop member 3. Fig. 5 shows the same relative positions of the elements of the mechanism when the sleeve 7 is shifted laterally in the opposite direction so that the teeth 8 engage the synchronizing ring 14. If the directions of the arrows indicating rotation were reversed in Figs. 4 and 5, the operations would be the same, except that the teeth 10 and 9, respectively, would be forced against the stop members 3 in these views.

By reference to Fig. 5, it will be noted that the shifting pressure applied to the sleeve 7 is exerting a force P on the sloping end surface of the tooth 10, an equal force being applied against the sloping surface 6 of the stop member 3. The force P and the angle $\alpha$ produce a setting back moment of the shift sleeve 7 about the axis of the driving shaft, which counteracts the moment resulting from the frictional contact of the synchronizing ring by the sleeve 7 and the angle $\alpha$. After synchronism between the parts of the mechanism has taken place and the synchronizing pressure between the member 3 and the side of tooth 10 is reduced, the force P causes relative movement of the sleeve and sleeve carrier to the extent that the sleeve is forced by the angle $\alpha$ into the position shown in Fig. 6, in which the head of the stop member 3 is symmetrically positioned between the teeth 9 and 10, and the teeth 8 of the shifting sleeve are in mesh with the teeth 18 of the coupling gear 16. In completing the coupling operation, the sloping surface of the tooth 10 slides along the surface 6 and both teeth 9 and 10 are guided along the sides of the head 4. In the shifted position of Fig. 6 there is no rotational play between the sleeve and sleeve carrier except that usually present in meshing gears. When the shift is made in the opposite direction, such as in the case of completing the shift started in accordance with Fig. 4, the gear teeth 8 mesh with the teeth 17 of the coupling gear 15. The angle $\alpha$ preferably has a value of from 10 to 45°.

In the operation of the synchronizing mechanism, as described above, it will be noted that the person manipulating the shifting sleeve 7 cannot apply an unlimited pressure to the synchronizing mechanism. An overloading of the coupling members, represented by the synchronizing rings and the crown friction surfaces of the sleeve teeth cannot take place, because of the relationships existing between these elements. For this reason it is also impossible to accelerate the synchroninzing of the gears by the use of additional force, since the locking arrangement provided by the stop members 3 and the teeth 9 and 10, in the positions shown in Figs. 4 and 5, makes it impossible to complete the gear change before the coupling members reach synchronism. However, by the use of the spring rings 13 and 14 a servo effect is brought about while synchronization is in progress, since there is a great increase in the pressure applied against the end of the synchronizing ring involved in the shift, which end bears against the projection on the adjacent coupling gear. The pressure applied against the end of the ring tends to expand it and thereby increase the contact pressure on the crowns of the sleeve teeth.

When changing over from a low to a higher gear, for instance, from the third to the fourth gear, a smaller synchronizing effort is required than in the reverse shift, as is well known. A construction, therefore, may be provided within the scope of the invention when for instance, the top speed of the gear, which can only be changed from bottom to top, is made without the locking feature. The locking effect for the different speeds of a constructional form may be different. This is accomplished by making the angle α of a different value. Thus, for instance, the angle α may be made smaller for the first speed than for the third speed.

I claim:

1. Change-speed gears including a synchronizing means therefor, comprising a sleeve carrier, a laterally slidable sleeve on said sleeve carrier, a coupling gear axially mounted with respect to said carrier and sleeve and having a set of external gear teeth, said slidable sleeve being provided with a set of internal gear teeth adapted to mesh with the external gear teeth of the coupling gear, a spring ring member mounted between the sleeve carrier and the coupling gear having a peripheral friction surface located in a position to be engaged by the inwardly facing surfaces of the gear teeth of the sleeve when the latter is shifted toward the coupling gear, said spring ring member being connected with the coupling gear for rotation therewith, the inner surfaces of the gear teeth of the slidable sleeve serving as friction bodies for frictionally engaging said spring ring member for bringing the sleeve and coupling gear in synchronism with each other, and a plurality of stop members fixed to and projecting from the peripheral surface of the sleeve carrier and engaged in the set of internal gear teeth of the slidable sleeve for keying the sleeve to the sleeve carrier, at least some of said stop members including an enlarged head portion facing toward the coupling gear and having a sloping surface extending from the enlarged head portion to the narrower portion of the stop member, a tooth of said set of gear teeth of the sleeve adjacent to said stop member having a sloping surface cooperating with and adapted to engage the sloping surface of the stop member associated therewith when the sleeve is shifted toward the coupling gear.

2. Change-speed gears as claimed in claim 1, in which the sloping surface of said tooth is at an angle of from 10 to 45° with respect to a plane parallel to the sleeve.

3. Change-speed gears including a synchronizing means, comprising a shaft, a sleeve carrier wheel fixed to said shaft for rotation therewith and against longitudinal displacement, a laterally-slidable sleeve around said sleeve carrier wheel and keyed thereto, a coupling gear rotatably mounted on said shaft adjacent to said sleeve carrier wheel and sleeve and having a set of external gear teeth, said slidable sleeve being provided with an internal set of gear teeth adapted to mesh with the external gear teeth of the coupling gear, a slit spring friction ring mounted between the sleeve carrier wheel and the coupling gear and spaced from said shaft, said ring having a peripheral friction surface located in a position to be engaged by the under surfaces of the gear teeth of the slidable sleeve, said ring having its ends spaced apart to permit contraction, means for holding said ring against appreciable relative rotation with respect to the coupling gear, the gear teeth of the slidable sleeve serving as friction bodies for frictionally engaging the friction surface of said ring for bringing the sleeve and coupling gear into synchronism with each other when the slidable sleeve is shifted into engagement with said ring, and means for retaining said ring in a position substantially concentric to said shaft while permitting said ring to be contracted when engaged by the gear teeth of the slidable sleeve.

4. Change-speed gears as claimed in claim 3, in which said retaining means comprises projections on the gear teeth of the coupling gear engaging the periphery of the ring.

5. Change-speed gears including a synchronizing means, comprising a rotatable shaft, a sleeve carrier fixed to the shaft against longitudinal displacement and relative rotation, a sleeve around said sleeve carrier, said sleeve being slidable longitudinally on said sleeve carrier and held against substantial relative rotation, a coupling gear axially mounted with respect to said shaft and sleeve and having a set of external gear teeth, said shaft and sleeve being rotatable relative to said coupling gear, said slidable sleeve being provided with an internal set of gear teeth adapted to mesh with the external gear teeth of the coupling gear, a contractible spring synchronizing ring mounted adjacent the coupling gear between the sleeve carrier and the coupling gear and having a peripheral friction surface located in a position to be engaged by the inner surfaces of the gear teeth of the slidable sleeve which inner surfaces function as friction bodies for frictionally engaging the peripheral surface of said synchronizing ring, and means for holding said synchronizing ring against appreciable relative rotation with respect to said coupling gear, whereby the synchronizing ring cooperates directly with the inner surfaces of the gear teeth of the slidable sleeve to bring the coupling gear into synchronism with the rotatable shaft when the slidable sleeve is shifted toward the coupling gear and into engagement with the synchronizing ring.

6. Change-speed gears as claimed in claim 5 in which the means for holding the sleeve against substantial relative rotation with respect to the sleeve carrier comprises spaced radially extending projections on the sleeve carrier respectively engaged by at least some of the internal gear teeth of the sleeve.

7. Change-speed gears as claimed in claim 5, in which said synchronizing ring comprises a slit spring ring axially mounted with respect to the axis of the coupling gear and having ends spaced apart, and abutment means on said coupling gear extending between said ends.

References Cited in the file of this patent

UNITED STATES PATENTS

| | | |
|---|---|---|
| 1,579,728 | Murray et al. | Apr. 6, 1926 |
| 2,201,169 | Griswold | May 21, 1940 |
| 2,418,838 | Huebner, Jr. | Apr. 15, 1947 |

FOREIGN PATENTS

| | | |
|---|---|---|
| 220,382 | Switzerland | July 1, 1942 |
| 403,319 | Great Britain | Dec. 21, 1933 |